US011503297B2

(12) United States Patent
Wang et al.

(10) Patent No.: US 11,503,297 B2
(45) Date of Patent: Nov. 15, 2022

(54) METHOD AND DEVICE FOR INVERSE QUANTIZATION AND INVERSE TRANSFORMATION AND NON-TRANSITORY COMPUTER-READABLE STORAGE MEDIUM

(71) Applicant: ZTE Corporation, Shenzhen (CN)

(72) Inventors: Hong Wang, Shenzhen (CN); Ke Xu, Shenzhen (CN); Bo Huang, Shenzhen (CN); Chengqiang Liu, Shenzhen (CN); Sheng Luo, Shenzhen (CN); Guoning Lu, Shenzhen (CN); Degen Zhen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/295,266

(22) PCT Filed: Nov. 20, 2019

(86) PCT No.: PCT/CN2019/119762
§ 371 (c)(1),
(2) Date: May 19, 2021

(87) PCT Pub. No.: WO2020/103876
PCT Pub. Date: May 28, 2020

(65) Prior Publication Data
US 2022/0014745 A1    Jan. 13, 2022

(30) Foreign Application Priority Data
Nov. 20, 2018  (CN) .......................... 201811385822.0

(51) Int. Cl.
*H04N 19/42* (2014.01)
*H04N 19/60* (2014.01)
(Continued)

(52) U.S. Cl.
CPC ........... *H04N 19/124* (2014.11); *H04N 19/42* (2014.11); *H04N 19/60* (2014.11); *H04N 19/85* (2014.11)

(58) Field of Classification Search
None
See application file for complete search history.

(56) References Cited

U.S. PATENT DOCUMENTS

2015/0195522 A1*  7/2015  Li .................. H04N 19/157
                                                      375/240.03
2021/0297702 A1*  9/2021  Nakagami ........... H04N 19/45

FOREIGN PATENT DOCUMENTS

CN     102006478 A     4/2011
CN     102404569 A     4/2012
(Continued)

OTHER PUBLICATIONS

Ma, Siwei, et al. "Kernel Technologies and Applications of AVS2 Video Coding Standard" Telecommunications Science, Aug. 20, 2017 (Aug. 20, 2017), ISSN: 1000-0801, pp. 7 and 8, Section 3.3, "Optimized hierarchical transformation" Beijing, China.

Zhou, Yun, et al. "Key Technologies of AVS2 Video Coding" Radio & Television Information, Sep. 15, 2015 (Sep. 15, 2015). ISSN: 1007-1997, p. 20, Section 2.4, "Transformation".

(Continued)

*Primary Examiner* — Samuel D Fereja
(74) *Attorney, Agent, or Firm* — Vivacqua Crane, PLLC

(57) ABSTRACT

Provided are method and device for inverse quantization and inverse transformation and non-transitory computer-readable storage medium. The method includes: performing inverse quantization processing on input data; determining whether secondary inverse transform processing is necessary; performing, in response to determining that the secondary inverse transform processing is necessary, the secondary inverse transform processing on data obtained through the inverse quantization processing, first one-dimensional inverse transform control processing on data obtained through the secondary inverse transform process- (Continued)

ing, and second one-dimensional inverse transform control processing on data obtained through the first one-dimensional inverse transform control processing; and performing, in response to determining that the secondary inverse transform processing is unnecessary, first one-dimensional inverse transform control processing on the data obtained through the inverse quantization processing, and second one-dimensional inverse transform control processing on the data obtained through the first one-dimensional inverse transform control processing.

9 Claims, 6 Drawing Sheets

(51) Int. Cl.
*H04N 19/85* (2014.01)
*H04N 19/124* (2014.01)

(56) References Cited

FOREIGN PATENT DOCUMENTS

| | | |
|---|---|---|
| CN | 103997650 A | 8/2014 |
| CN | 106254883 A | 12/2016 |

OTHER PUBLICATIONS

International Search Report and Written Opinion for the International Patent Application No. PCT/CN2019/119762 dated Feb. 17, 2020.
Ma, et al. "Kernel technologies and applications of AVS2 video coding standard," Telecommunications Technology, Aug. 2017, pp. 3-15.
The State Intellectual Property Office of People's Republic of China. First Office Action for CN Application No. 2018113858220 and English translation, dated Aug. 15, 2022, pp. 1-9.
The State Intellectual Property Office of People's Republic of China. First Search Report for CN Application No. 2018113858220 and English translation, dated Aug. 9, 2022, pp. 1-4.

* cited by examiner

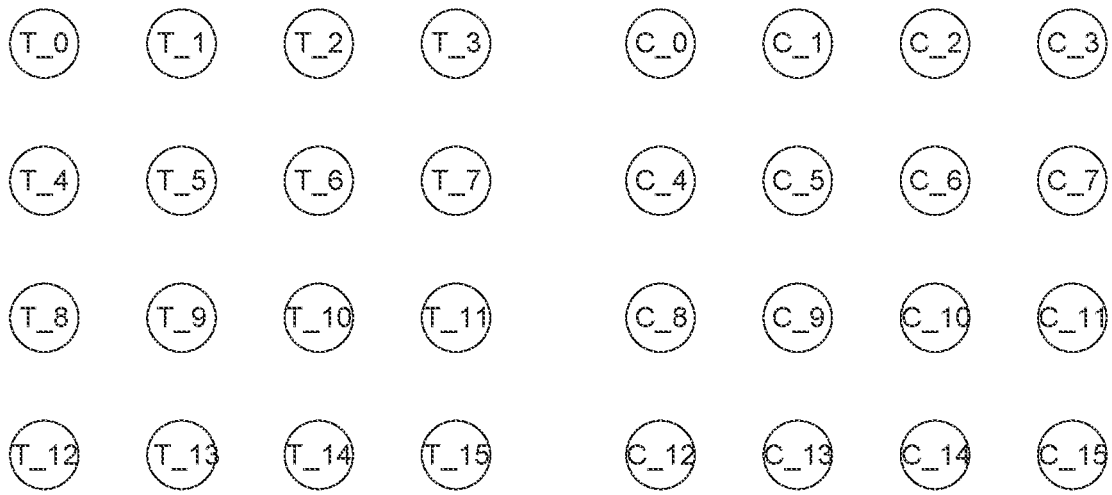

FIG. 4

```
MUL0 : C_0 * 0T_0; MUL1 : C_0 * 0T_4; MUL2 : C_0 * 0T_8 ; MUL3 : C_0 * 0T_12;
MUL4 : C_1 * 0T_0; MUL5 : C_1 * 0T_4; MUL6 : C_1 * 0T_8 ; MUL7 : C_1 * 0T_12;
MUL8 : C_2 * 0T_0; MUL9 : C_2 * 0T_4; MUL10: C_2 * 0T_8 ; MUL11: C_2 * 0T_12;
MUL12: C_3 * 0T_0; MUL13: C_3 * 0T_4; MUL14: C_3 * 0T_8 ; MUL15: C_3 * 0T_12;
MUL16: C_4 * 0T_1; MUL17: C_4 * 0T_5; MUL18: C_4 * 0T_9 ; MUL19: C_4 * 0T_13;
MUL20: C_5 * 0T_1; MUL21: C_5 * 0T_5; MUL22: C_5 * 0T_9 ; MUL23: C_5 * 0T_13;
MUL24: C_6 * 0T_1; MUL25: C_6 * 0T_5; MUL26: C_6 * 0T_9 ; MUL27: C_6 * 0T_13;
MUL28: C_7 * 0T_1; MUL29: C_7 * 0T_5; MUL30: C_7 * 0T_9 ; MUL31: C_7 * 0T_13;
MUL32: C_8 * 0T_2; MUL33: C_8 * 0T_6; MUL34: C_8 * 0T_10; MUL35: C_8 * 0T_14;
MUL36: C_9 * 0T_2; MUL37: C_9 * 0T_6; MUL38: C_9 * 0T_10; MUL39: C_9 * 0T_14;
MUL40: C_10* 0T_2; MUL41: C_10* 0T_6; MUL42: C_10* 0T_10; MUL43: C_10* 0T_14;
MUL44: C_11* 0T_2; MUL45: C_11* 0T_6; MUL46: C_11* 0T_10; MUL47: C_11* 0T_14;
MUL48: C_12* 0T_3; MUL49: C_12* 0T_7; MUL50: C_12* 0T_11; MUL51: C_12* 0T_15;
MUL52: C_13* 0T_3; MUL53: C_13* 0T_7; MUL54: C_13* 0T_11; MUL55: C_13* 0T_15;
MUL56: C_14* 0T_3; MUL57: C_14* 0T_7; MUL58: C_14* 0T_11; MUL59: C_14* 0T_15;
MUL60: C_15* 0T_3; MUL61: C_15* 0T_7; MUL62: C_15* 0T_11; MUL63: C_15* 0T_15;
```

FIG. 5

```
ADD0:  MUL0 + MUL16 + MUL32 + MUL48; ADD1:  MUL4 + MUL20 + MUL36 + MUL52;
ADD2:  MUL8 + MUL24 + MUL40 + MUL56; ADD3:  MUL12+ MUL28 + MUL44 + MUL60;
ADD4:  MUL1 + MUL17 + MUL33 + MUL49; ADD5:  MUL5 + MUL21 + MUL37 + MUL53;
ADD6:  MUL9 + MUL25 + MUL41 + MUL57; ADD7:  MUL13+ MUL29 + MUL45 + MUL61;
ADD8:  MUL2 + MUL18 + MUL34 + MUL50; ADD9:  MUL6 + MUL22 + MUL38 + MUL54;
ADD10: MUL10+ MUL26 + MUL42 + MUL58; ADD11: MUL14+ MUL30 + MUL46 + MUL62;
ADD12: MUL3 + MUL19 + MUL35 + MUL51; ADD13: MUL7 + MUL23 + MUL39 + MUL55;
ADD14: MUL11+ MUL27 + MUL43 + MUL59; ADD15: MUL15+ MUL31 + MUL47 + MUL63;
```

| 4x4_0 | 4x4_1 | 4x4_4 | 4x4_5 | 4x4_16 | 4x4_17 | 4x4_20 | 4x4_21 |
|---|---|---|---|---|---|---|---|
| 4x4_2 | 4x4_3 | 4x4_6 | 4x4_7 | 4x4_18 | 4x4_19 | 4x4_22 | 4x4_23 |
| 4x4_8 | 4x4_9 | 4x4_12 | 4x4_13 | 4x4_24 | 4x4_25 | 4x4_28 | 4x4_29 |
| 4x4_10 | 4x4_11 | 4x4_14 | 4x4_15 | 4x4_26 | 4x4_27 | 4x4_30 | 4x4_31 |
| 4x4_32 | 4x4_33 | 4x4_36 | 4x4_37 | 4x4_48 | 4x4_49 | 4x4_52 | 4x4_53 |
| 4x4_34 | 4x4_35 | 4x4_38 | 4x4_39 | 4x4_50 | 4x4_51 | 4x4_54 | 4x4_55 |
| 4x4_40 | 4x4_41 | 4x4_44 | 4x4_45 | 4x4_56 | 4x4_57 | 4x4_60 | 4x4_61 |
| 4x4_42 | 4x4_43 | 4x4_46 | 4x4_47 | 4x4_58 | 4x4_59 | 4x4_62 | 4x4_63 |

T

| 4x4_0 | 4x4_1 | 4x4_2 | 4x4_3 | 4x4_4 | 4x4_5 | 4x4_6 | 4x4_7 |
|---|---|---|---|---|---|---|---|
| 4x4_8 | 4x4_9 | 4x4_10 | 4x4_11 | 4x4_12 | 4x4_13 | 4x4_14 | 4x4_15 |
| 4x4_16 | 4x4_17 | 4x4_18 | 4x4_19 | 4x4_20 | 4x4_21 | 4x4_22 | 4x4_23 |
| 4x4_24 | 4x4_25 | 4x4_26 | 4x4_27 | 4x4_28 | 4x4_29 | 4x4_30 | 4x4_31 |
| 4x4_32 | 4x4_33 | 4x4_34 | 4x4_35 | 4x4_36 | 4x4_37 | 4x4_38 | 4x4_39 |
| 4x4_40 | 4x4_41 | 4x4_42 | 4x4_43 | 4x4_44 | 4x4_45 | 4x4_46 | 4x4_47 |
| 4x4_48 | 4x4_49 | 4x4_50 | 4x4_51 | 4x4_52 | 4x4_53 | 4x4_54 | 4x4_55 |
| 4x4_56 | 4x4_57 | 4x4_58 | 4x4_59 | 4x4_60 | 4x4_61 | 4x4_62 | 4x4_63 |

```
MUL0 : C_0 * OT_0 ; MUL1 : C_0 * OT_1 ; MUL2 : C_0 * OT_2 ; MUL3 : C_0 * OT_3 ;
MUL4 : C_1 * OT_4 ; MUL5 : C_1 * OT_5 ; MUL6 : C_1 * OT_6 ; MUL7 : C_1 * OT_7 ;
MUL8 : C_2 * OT_8 ; MUL9 : C_2 * OT_9 ; MUL10: C_2 * OT_10; MUL11: C_2 * OT_11;
MUL12: C_3 * OT_12; MUL13: C_3 * OT_13; MUL14: C_3 * OT_14; MUL15: C_3 * OT_15;
MUL16: C_4 * OT_0 ; MUL17: C_4 * OT_1 ; MUL18: C_4 * OT_2 ; MUL19: C_4 * OT_3 ;
MUL20: C_5 * OT_4 ; MUL21: C_5 * OT_5 ; MUL22: C_5 * OT_6 ; MUL23: C_5 * OT_7 ;
MUL24: C_6 * OT_8 ; MUL25: C_6 * OT_9 ; MUL26: C_6 * OT_10; MUL27: C_6 * OT_11;
MUL28: C_7 * OT_12; MUL29: C_7 * OT_13; MUL30: C_7 * OT_14; MUL31: C_7 * OT_15;
MUL32: C_8 * OT_0 ; MUL33: C_8 * OT_1 ; MUL34: C_8 * OT_2 ; MUL35: C_8 * OT_3 ;
MUL36: C_9 * OT_4 ; MUL37: C_9 * OT_5 ; MUL38: C_9 * OT_6 ; MUL39: C_9 * OT_7 ;
MUL40: C_10* OT_8 ; MUL41: C_10* OT_9 ; MUL42: C_10* OT_10; MUL43: C_10* OT_11;
MUL44: C_11* OT_12; MUL45: C_11* OT_13; MUL46: C_11* OT_14; MUL47: C_11* OT_15;
MUL48: C_12* OT_0 ; MUL49: C_12* OT_1 ; MUL50: C_12* OT_2 ; MUL51: C_12* OT_3 ;
MUL52: C_13* OT_4 ; MUL53: C_13* OT_5 ; MUL54: C_13* OT_6 ; MUL55: C_13* OT_7 ;
MUL56: C_14* OT_8 ; MUL57: C_14* OT_9 ; MUL58: C_14* OT_10; MUL59: C_14* OT_11;
MUL60: C_15* OT_12; MUL61: C_15* OT_13; MUL62: C_15* OT_14; MUL63: C_15* OT_15;
```

FIG. 9

```
ADD0: MUL0 + MUL4  + MUL8  + MUL12; ADD1: MUL1 + MUL5  + MUL9  + MUL13;
ADD2: MUL2 + MUL6  + MUL10 + MUL14; ADD3: MUL3 + MUL7  + MUL11 + MUL15;
ADD4: MUL16+ MUL20 + MUL24 + MUL28; ADD5: MUL17+ MUL21 + MUL25 + MUL29;
ADD6: MUL18+ MUL22 + MUL26 + MUL30; ADD7: MUL19+ MUL23 + MUL27 + MUL31;
ADD8: MUL32+ MUL36 + MUL40 + MUL44; ADD9: MUL33+ MUL37 + MUL41 + MUL45;
ADD10:MUL34+ MUL38 + MUL42 + MUL46; ADD11:MUL35+ MUL39 + MUL43 + MUL47;
ADD12:MUL48+ MUL52 + MUL56 + MUL60; ADD13:MUL49+ MUL53 + MUL57 + MUL61;
ADD14:MUL50+ MUL54 + MUL58 + MUL62; ADD15:MUL51+ MUL55 + MUL59 + MUL63;
```

FIG. 10

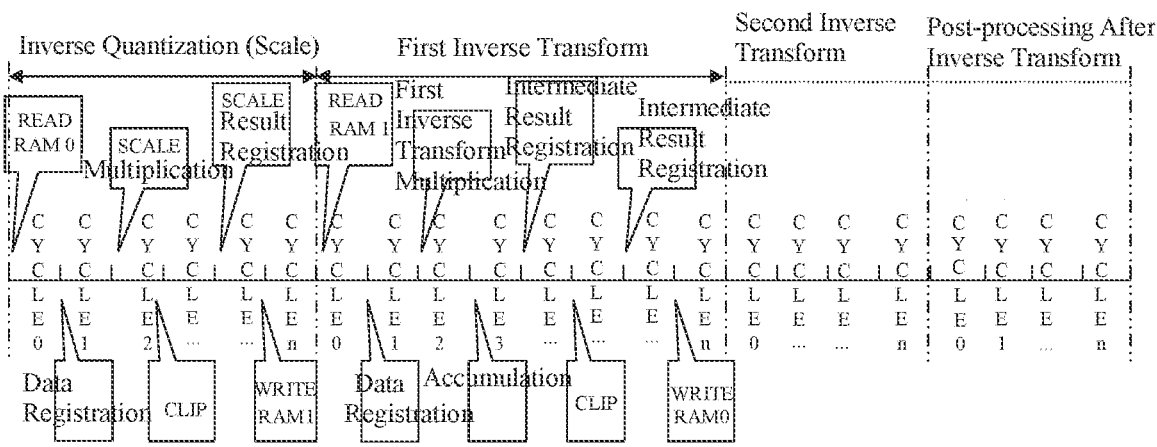

FIG. 11

METHOD AND DEVICE FOR INVERSE QUANTIZATION AND INVERSE TRANSFORMATION AND NON-TRANSITORY COMPUTER-READABLE STORAGE MEDIUM

CROSS-REFERENCE TO RELATED APPLICATION

This application is a national stage filing under 35 U.S.C. § 371 of international application No. PCT/CN2019/119762, filed Nov. 20, 2019, which claims priority to Chinese patent application No. 201811385822.0, filed Nov. 20, 2018. The contents of these applications are incorporated herein by reference in their entirety.

TECHNICAL FIELD

The present disclosure relates to video image processing technology in the field of multimedia information processing, and in particular to a method and device for inverse quantization and inverse transform and a non-transitory computer-readable storage medium.

BACKGROUND

With the development of video image processing technology, video applications are developing rapidly towards higher resolution and higher compression ratio. The video coding and decoding standards have been updated frequently, and competitions among different standards is increasingly fierce. Therefore, for chip designers, it is necessary to use chips with smaller area (and lower cost) to be compatible with previous standards and support different standards.

Generally, methods for reducing the chip area include the use of butterfly computation to reduce the amount of computation and speed up running. Therefore, under the same standard, a small-size butterfly computation logic may be reused for large-size inverse transform to reduce the chip area. However, the butterfly computation has certain differences under different standards, and therefore cannot be completely reused.

SUMMARY

According to some embodiments of the present disclosure, a method and device for inverse quantization and inverse transform and a non-transitory computer-readable storage medium are provided.

According to the embodiments of the present disclosure, a method for inverse quantization and inverse transform is provided, the method may include:

performing inverse quantization processing on input data according to inverse quantization characteristics of different coding and decoding standards;

determining whether secondary inverse transform processing is necessary according to a coding and decoding standard of the input data;

performing, in response to determining that the secondary inverse transform processing is necessary, the secondary inverse transform processing on data obtained through the inverse quantization processing, first one-dimensional inverse transform control processing on data obtained through the secondary inverse transform processing, and second one-dimensional inverse transform control processing on data obtained through the first one-dimensional inverse transform control processing; and performing, in response to determining that the secondary inverse transform processing is unnecessary, first one-dimensional inverse transform control processing on the data obtained through the inverse quantization processing, and second one-dimensional inverse transform control processing on the data obtained through the first one-dimensional inverse transform control processing.

According to the embodiments the present disclosure, a device for inverse quantization and inverse transform is provided, the device may include:

a cache unit, configured to store data;

an arithmetic unit, configured to perform an arithmetic operation; and a control unit, configured to perform inverse quantization processing on input data according to inverse quantization characteristics of different coding and decoding standards; determine whether second inverse transform processing is necessary according to a coding and decoding standard of the input data; perform, in response to determining that the second inverse transform processing is necessary, the second inverse transform processing on data obtained through the inverse quantization processing, first one-dimensional inverse transform control processing on data obtained through the secondary inverse transform processing, and second one-dimensional inverse transform control processing on data obtained through the first one-dimensional inverse transform control processing; and perform, in response to determining that secondary inverse transform is unnecessary, the first one-dimensional inverse transform control processing on the data obtained through the inverse quantization processing and the second one-dimensional inverse transform control processing on the data obtained through the first one-dimensional inverse transform control processing.

According to the embodiments of the present disclosure, a non-transitory computer-readable storage medium is provided. The non-transitory computer-readable storage medium stores computer-executable instructions, which when executed, perform the method for inverse quantization and inverse transform.

BRIEF DESCRIPTION OF DRAWINGS

FIG. 4 is a schematic diagram of a layout of multipliers with cycle0C4×4_0*T4×4_0/1/2/3 taken as an example according to an embodiment of the present disclosure;

FIG. 5 is a schematic diagram of calculation results of 64 multipliers in the first one-dimensional inverse transform according to an embodiment of the present disclosure;

FIG. 6 is a schematic diagram of results obtained through 64 four-input adders in the first one-dimensional inverse transform according to an embodiment of the present disclosure;

FIG. 9 is a schematic diagram of calculation results of 64 multipliers in the second one-dimensional inverse transform according to an embodiment of the present disclosure;

FIG. 10 is a schematic diagram of results obtained through 64 four-input adders in the second one-dimensional inverse transform according to an embodiment of the present disclosure;

FIG. 11 is a schematic diagram reflecting inverse quantization and inverse transform according to an embodiment of the present disclosure.

DETAILED DESCRIPTION

To understand the characteristics and technical contents of the embodiments of the present disclosure in more detail, the embodiments of the present disclosure will be described in detail with reference to the drawings.

Figure 1:
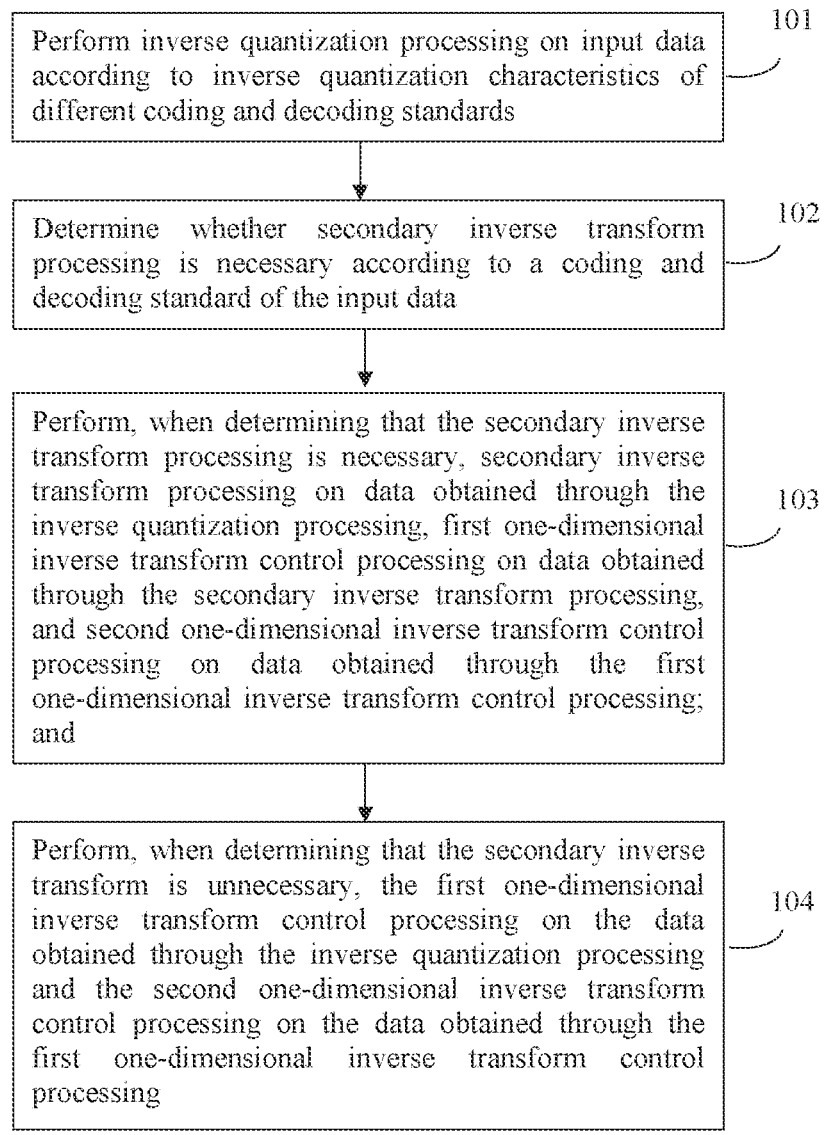
FIG. 1 is a flow diagram of a method for inverse quantization and inverse transform according to an embodiment of the present disclosure.

FIG. 1 is a flow diagram of a method for inverse quantization and inverse transform according to an embodiment of the present disclosure. As shown in FIG. 1, the method includes:

Step S101: performing inverse quantization processing on input data according to inverse quantization characteristics of different coding and decoding standards;

In some embodiments, the step of performing inverse quantization processing on input data may include:

performing, by calling an arithmetic unit in an arithmetic array, inverse quantization processing on the input data.

In some embodiments, the step of performing inverse quantization processing on input data includes:

according to the different coding and decoding standards, registering DC (Direct Current) inverse quantization coefficients and AC (Alternating Current) inverse quantization coefficients corresponding to N×N block data in advance, and completing inverse quantization multiplication, accumulation and clip processing on an N×N block data in each clock cycle, the DC inverse quantization coefficients and the AC inverse quantization coefficients being stored in a memory by N×N.

As shown in FIG. 1, the method further includes:

Step S102: determining whether secondary inverse transform processing is necessary according to a coding and decoding standard of the input data.

In some embodiments, the step of determining whether secondary inverse transform processing is necessary according to a coding and decoding standard of the input data may include:

judging whether the coding and decoding standard of the input data is a preset standard; and determining that the secondary inverse transform processing is necessary if the coding and decoding standard of the input data is the preset standard.

For example, the preset standard is AVS2 (Audio Video coding Standard 2), a second-generation digital audio and video coding and decoding standard.

That is to say, if the encoding and decoding standard of the input data is AVS2, it is determined that the secondary inverse transform processing is necessary, and if the encoding and decoding standard of the input data is not AVS2, it is determined that the secondary inverse transform processing is unnecessary.

As shown in FIG. 1, the method further includes:

Step S103: performing, when determining that the secondary inverse transform processing is necessary, secondary inverse transform processing on data obtained through the inverse quantization processing, first one-dimensional inverse transform control processing on data obtained through the secondary inverse transform processing, and second one-dimensional inverse transform control processing on data obtained through the first one-dimensional inverse transform control processing.

In some embodiments, the step of performing secondary inverse transform processing on the data obtained through the inverse quantization processing may include:

calling the arithmetic unit to perform operations (including multiplication, addition and clip) required by the secondary inverse transform processing.

In AVS2, there is a secondary inverse transform process, while there is no such process in other coding and decoding standards. This process is directly managed together with the inverse quantization processing, as during the processing of a Transform Unit (TU) block, there may be at most one N×N block that needs a secondary inverse transform. After the inverse quantization of the N×N block is finished, the arithmetic unit is called to perform multiplication, addition, clip and other operations required by the secondary inverse transform processing, and the data processed by the secondary inverse transform are stored in a register cache unit and written into corresponding RAM (Random Access Memory) addresses after the inverse quantization is finished.

In some embodiments, the step of performing first one-dimensional inverse transform control processing on data obtained through the inverse quantization processing may include:

for the different coding and decoding standards, performing, by calling the arithmetic unit, operations for implementing first one-dimensional inverse transform control processing required by processing at different processing time points, the operations for implementing first one-dimensional inverse transform control processing including multiplication, addition, clip and data registration.

In practical applications, almost all coding and decoding standards can convert two-dimensional inverse transform into two one-dimensional inverse transform processes, but there are some differences in how the different coding and decoding standards are handled: in some coding and decoding standards, the first one-dimensional inverse transform control processing is vertical inverse transform, and the second one-dimensional inverse transform control processing is horizontal inverse transform; in some other coding and decoding standards, the first one-dimensional inverse transform is horizontal inverse transform, and the second one-dimensional inverse transform is vertical inverse transform; in some other coding and decoding standards, coefficient matrices used in vertical inverse transform and horizontal inverse transform are consistent, and the only difference is that they are respectively a matrix and an inverse matrix; and in some other coding and decoding standards, the coefficient matrices used in vertical inverse transform and horizontal inverse transform are different.

For the different coding and decoding standards, a control unit calls the arithmetic unit to perform multiplication, addition, clip, data registration and other operations required by the processing at different processing time points to implement the first one-dimensional inverse transform control processing.

In some embodiments, the step of performing second one-dimensional inverse transform control processing on data obtained through the first one-dimensional inverse transform control processing may include:

for the different coding and decoding standards, performing, by calling the arithmetic unit, operations for implementing second one-dimensional inverse transform control processing required by processing at different processing time points, the operations for implementing second one-dimensional inverse transform control processing including multiplication, addition, clip and data registration.

For the different coding and decoding standards, the control unit calls the arithmetic unit to perform multiplication, addition, clip, data registration and other operations required by processing at different processing time points to implement the second one-dimensional inverse transform control processing.

As shown in FIG. 1, the method further includes:

Step S104: performing, when determining that the secondary inverse transform processing is unnecessary, first one-dimensional inverse transform control processing on the data obtained through the inverse quantization processing, and second one-dimensional inverse transform control processing on data obtained through the first one-dimensional inverse transform control processing.

The method further includes:

Step S105 (not shown in FIG. 1): determining whether it is necessary to perform post-processing on data obtained through the second one-dimensional inverse transform control processing;

In some embodiments, the step of determining whether it is necessary to perform post-processing on data obtained through the second one-dimensional inverse transform control processing includes:

determining, when the coding and decoding standard of the input data is a preset standard and an algorithm used in the preset standard includes a preset algorithm, that it is necessary to perform post-processing on the data obtained through the second one-dimensional inverse transform control processing.

For example, the preset standard is AVS2, and the preset algorithm is an upsample algorithm.

In AVS2, there is an upsample processing process, while there is no such process in the other standards. According to the upsample algorithm, the control unit calls the arithmetic unit to perform multiplication, addition, clip, data registration and other operations required by upsample, so as to implement the processing process after the inverse transform.

The method further includes:

Step S106 (not shown in FIG. 1): performing, when determining that post-processing is necessary, post-processing on data obtained through the second one-dimensional inverse transform control processing, and outputting data obtained through the post-processing;

In some embodiments, the step of performing post-processing on data obtained through the second one-dimensional inverse transform control processing may include:

performing size transformation on the data obtained through the second one-dimensional inverse transform control processing, such that the data processed by the size transformation are matched with a size standard of a transformation unit.

The method further includes:

Step S107 (not shown in FIG. 1): outputting, when determining that post-processing is unnecessary, the data obtained through the second one-dimensional inverse transform control processing.

By adopting the method according to some embodiments of the present disclosure, a corresponding logic can be reused to the maximum extent for the functional parts for inverse quantization and inverse transform, so that the functional parts for inverse quantization and inverse transform can be compatible with the previous standards and support different standards with a smaller chip area and lower cost. Compared with the existing technology, the method can implement the reuse of arithmetic logics under multiple coding and decoding standards, achieving the expected effect and decoding performance, saving the logic implementation area and enhancing the competitiveness of the chips.

Figures 2, 3:
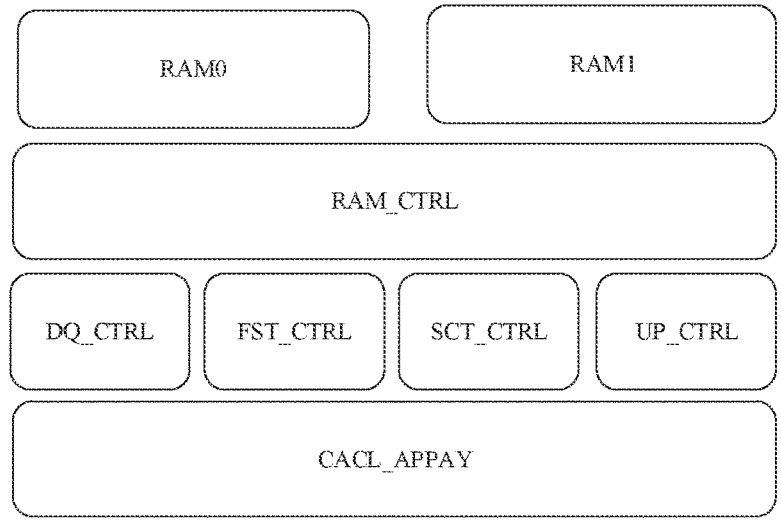
FIG. 2 is a block diagram of an overall design for implementing inverse quantization and inverse transform according to an embodiment of the present disclosure.
FIG. 3 is a schematic diagram of a first one-dimensional inverse transform $V=T_{M2}^{T}*C$ according to an embodiment of the present disclosure.

FIG. 2 shows a block diagram of an overall design for implementing inverse quantization and inverse transform. As shown in FIG. 2, RAM0 denotes a random-access memory 0, RAM1 denotes a random-access memory 1, RAM_CTRL denotes a RAM logic controller, DQ_CTRL denotes inverse quantization control, FST_CTRL denotes first one-dimensional inverse transform control, SCT_CTRL denotes second one-dimensional inverse transform control, UP_CTRL denotes post-processing control, and CACL_APPA denotes an arithmetic array. In the scheme according to some embodiments of the present disclosure, the existing video coding and decoding standards are analyzed. Although there are different processing modes for inverse quantization and inverse transform processes under different standards, arithmetic units are basically the same, such as multiplication, addition, clip and data registration, and there is little difference in data bit width. Therefore, if these arithmetic units are extracted for reuse as a common unit, the inverse quantization and inverse transform processes under different standards can be implemented by controlling the call of the arithmetic unit under different standards. Through the block diagram of the overall design shown in FIG. 2, under the condition of achieving standard processing performance, resource reuse is achieved to a greater extent, thus saving the logic implementation area of a multi-standard decoder. Since the arithmetic logics of inverse quantization and inverse transform can be reused under different standards, the arithmetic logics of inverse quantization and inverse transform may be reused to a greater extent, and the logical area of inverse quantization and inverse transform under multiple standards can be reduced.

Embodiment II

According to the characteristics of inverse transform, a two-dimensional inverse transform may be converted into two one-dimensional inverse transforms: first one-dimensional inverse transform $V=T_{M2}T*C$ ($T_{M2}^T$ is a transpose of an M2×M2 inverse transform matrix) and second one-dimensional inverse transform $W=K*T_{M1}$ ($T_{M1}$ is an M1×M1 inverse transform matrix), and "*" denotes convolution. Residual data are stored in a RAM by N×N (such as 4×4), and the calculations of the two inverse transform processes are processed by 4×4.

The process of inverse quantization and inverse transform will be described in detail below through steps A, B, C, D, and E.

A. Inverse Quantization Control

At the stage of inverse quantization, data in RAM0 is read, and the arithmetic unit in the arithmetic array is called to perform inverse quantization processing. If there is no second inverse transform (for example, the coding and decoding standard is not AVS2), an intermediate result is written into RAM1; and if there is a second inverse transform (for example, the coding and decoding standard is AVS2), the second inverse transform is performed.

B. Second Inverse Transform Processing

If there is the second inverse transform (for example, the coding and decoding standard is AVS2), the arithmetic unit in the arithmetic array is called again to perform second inverse transform processing by using a result obtained after the inverse quantization processing, and then an intermediate result is written into RAM1.

C. First One-Dimensional Inverse Transform Control Processing

The data in RAM1 are read, the arithmetic unit in the arithmetic array is called to perform first one-dimensional inverse transform control processing, and then an intermediate result is written into RAM0.

The arithmetic array includes a multiplier group, a register group, an adder group, and a clip logic. The arithmetic unit in the arithmetic array is called at different time points according to a time sequence of processing different transform sizes such as 4×4, 8×8, 16×16 and 32×32.

Taking 4×4 as an example, FIG. 3 shows a schematic diagram of the first one-dimensional inverse transform $V=T_{M2}{}^{T}*C$, and the following results may be obtained by referring to FIG. 3:

cycle 0: C4×4_0*T4×4_0/1/2/3; 4 results are cached to relays 0-3;

cycle1: C4×4_0*T4×4_4/5/6/7; 4 results are cached to relays 4-7;

cycle2: C4×4_2*T4×4_8/9/10/11; the cached results are updated to relays 0-3;

cycle3: C4×4_2*T4×4_12/13/14/15; the cached results are updated to relays 4-7;

cycle4: C4×4_8*T4×4_16/17/18/19; the cached results are updated to relays 0-3;

cycle5: C4×4_8*T4×4_20/21/22/23; the cached results are updated to relays 4-7;

cycle6: C4×4_10*T4×4_24/25/26/27; the cached results are updated to relays 0-3;

cycle7: C4×4_10*T4×4_28/29/30/31; the cached results are updated to relays 4-7;

cycle8: C4×4_32*T4×4_32/33/34/35; the cached results are updated to relays 0-3;

cycle9: C4×4_32*T4×4_36/37/38/39; the cached results are updated to relays 4-7;

cycle10: C4×4_34*T4×4_40/41/42/43; the cached results are updated to relays 0-3;

cycle11: C4×4_34*T4×4_44/45/46/47; the cached results are updated to relays 4-7;

cycle12: C4×4_40*T4×4_48/49/50/51; the cached results are updated to relays 0-3;

cycle13: C4×4_40*T4×4_52/53/54/55; the cached results are updated to relays 4-7;

cycle14: C4×4_42*T4×4_56/57/58/59; the cached results are updated to relays 0-3;

cycle15: C4×4_42*T4×4_60/61/62/63; the cached results are updated to relays 4-7;

Then, after 16 beats, the results may be written into RAM addresses: 0/2/8/10/32/34/40/42;

After the next 16 beats, the results may be written into RAM addresses: 1/3/9/11/33/35/41/43; caches 8-15 are used;

After the next 16 beats, the results may be written into RAM addresses: 4/6/12/14/36/38/44/46; caches 0-7 are used;

After the next 16 beats, the results may be written into RAM addresses: 5/7/13/15/37/39/45/47; caches 8-15 are used;

After the next 16 beats, the results may be written into RAM addresses: 16/18/24/26/48/50/56/58; caches 0-7 are used;

After the next 16 beats, the results may be written into RAM addresses: 17/19/25/27/49/51/57/59; caches 8-15 are used;

After the next 16 beats, the results may be written into RAM addresses: 20/22/28/30/52/54/60/62; caches 0-7 are used;

After the next 16 beats, the results may be written into RAM addresses: 21/23/29/31/53/55/61/63; caches 8-15 are used;

In the calculation process at one beat (taking cycle0C4×4_0*T4×4_0/1/2/3 as an example, the multiplier layout is shown in FIG. 4), the calculation results of 64 multipliers (MUL0-MUL63) among 256 multipliers are shown in FIG. 5. By analogy, the results of the remaining 192 multipliers are similar.

The results obtained by 16 four-input adders (ADD0-ADD15) among 64 four-input adders are shown in FIG. 6. By analogy, the results of the remaining 48 four-input adders are similar.

The addition of results by 16 two-input adders is equivalent to the addition of results by the four-input adders at the corresponding points.

D. Second One-Dimensional Inverse Transform Control Processing

The data in RAM0 are read, the arithmetic unit in the arithmetic array is called to perform second one-dimensional inverse transform control processing.

Figures 7, 8:
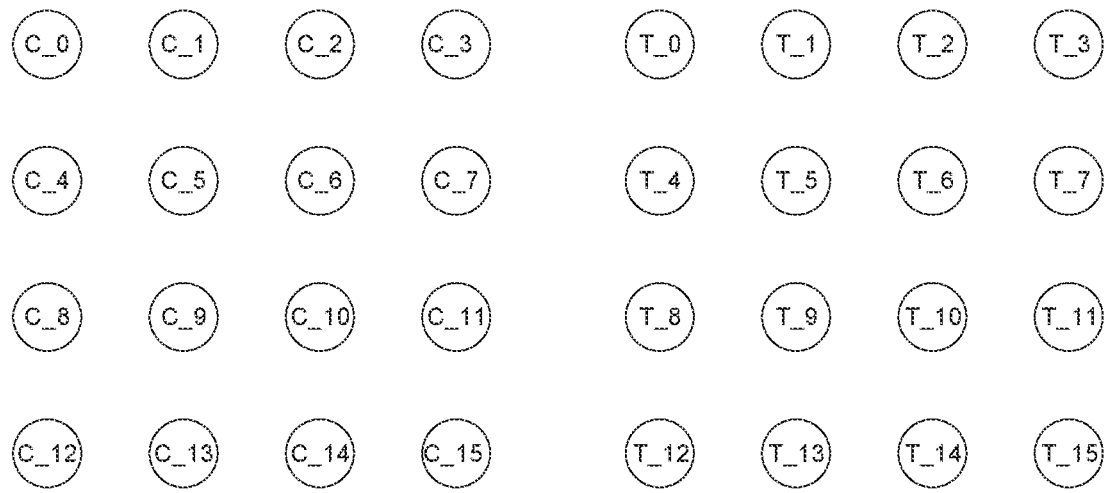
FIG. 7 is a schematic diagram of the second one-dimensional inverse transform $W=K*TM1$ according to an embodiment of the present disclosure.
FIG. 8 is a schematic diagram of a layout of multipliers with cycle0K4×4_0*T4×4_0/1/2/3 taken as an example according to an embodiment of the present disclosure.

Taking 4×4 as an example, FIG. 7 shows a schematic diagram of the second one-dimensional inverse transform $W=K*T_{M1}$, and the following results may be obtained by referring to FIG. 7:

cycle0: K4×4_0*T4×4_0/1/2/3; 4 results are cached to relays 0-3;

cycle1: K4×4_0*T4×4_4/5/6/7; 4 results are cached to relays 4-7;

cycle2: K4×4_1*T4×4_8/9/10/11; the cached results are updated to relays 0-3;

cycle3: K4×4_1*T4×4_12/13/14/15; the cached results are updated to relays 4-7;

cycle4: K4×4_4*T4×4_16/17/18/19; the cached results are updated to relays 0-3;

cycle5: K4×4_4*T4×4_20/21/22/23; the cached results are updated to relays 4-7;

cycle6: K4×4_5*T4×4_24/25/26/27; the cached results are updated to relays 0-3;

cycle7: K4×4_5*T4×4_28/29/30/31; the cached results are updated to relays 4-7;

cycle8: K4×4_16*T4×4_32/33/34/35; the cached results are updated to relays 0-3;

cycle9: K4×4_16*T4×4_36/37/38/39; the cached results are updated to relays 4-7;

cycle10: K4×4_17*T4×4_40/41/42/43; the cached results are updated to relays 0-3;

cycle11: K4×4_17*T4×4_44/45/46/47; the cached results are updated to relays 4-7;

cycle12: K4×4_20*T4×4_48/49/50/51; the cached results are updated to relays 0-3;

cycle13: K4×4_20*T4×4_52/53/54/55; the cached results are updated to relays 4-7;

cycle14: K4×4_21*T4×4_56/57/58/59; the cached results are updated to relays 0-3;

cycle15: K4×4_21*T4×4_60/61/62/63; the cached results are updated to relays 4-7;

Then, after 16 beats, the results may be written into RAM addresses: 0/1/4/5/16/17/20/21;

after the next 16 beats, the results may be written into RAM addresses: 2/3/6/7/18/19/22/23; caches 8-15 are used;

after the next 16 beats, the results may be written into RAM addresses: 8/9/12/13/24/25/28/29; caches 0-7 are used;

after the next 16 beats, the results may be written into RAM addresses: 10/11/14/15/26/27/30/31; caches 8-15 are used;

after the next 16 beats, the results may be written into RAM addresses: 32/33/36/37/48/49/52/53; caches 0-7 are used;

after the next 16 beats, the results may be written into RAM addresses: 34/35/38/39/50/51/54/55; caches 8-15 are used;

after the next 16 beats, the results may be written into RAM addresses: 40/41/44/45/56/57/60/61; caches 0-7 are used;

after the next 16 beats, the results may be written into RAM addresses: 42/43/46/47/58/59/62/63; caches 8-15 are used;

In the calculation process at one beat (taking cycle0K4×4_0*T4×4_0/1/2/3 as an example, the multiplier layout is shown in FIG. 8), the calculation results of 64 multipliers (MUL0-MUL63) among 256 multipliers are shown in FIG. 9. By analogy, the results of the remaining 192 multipliers are similar.

The results of 16 four-input adders (ADD0-ADD15) among 64 four-input adders are shown in FIG. 10. By analogy, the results of the remaining 48 four-input adders are similar.

The addition of results by 16 two-input adders is equivalent to the addition of results by the four-input adders at the corresponding points.

If there is post-processing (such as upsample processing of AVS2), an intermediate result is written back into RAM0;

If there is no post-processing, a processing result is written into RAM1, and the post-processing control is bypassed.

The term "bypass" here means that the logic is not processed by this part, that is, the logic is not processed by post-processing control.

E. Post-Processing Control

The data of RAM0 are read, the arithmetic unit in the arithmetic array is called to perform post-processing, and a processing result is written into RAM1.

FIG. 11 shows a schematic diagram reflecting the aforementioned inverse quantization and inverse transform. In FIG. 11, "Scale" denotes inverse quantization, "CLIP" denotes clip, and "CYCLE" denotes clock cycle. First, inverse quantization processing is performed on the input data, then first one-dimensional inverse transform control processing is performed on data obtained through the inverse quantization processing, then second one-dimensional inverse transform control processing is performed on data obtained through the first one-dimensional inverse transform control processing, and finally, post-processing is performed on data obtained through the second one-dimensional inverse transform control processing.

It can be seen that, although the inverse quantization and inverse transform processes have different processing modes under different standards, their arithmetic units are basically the same, such as multiplication, addition, clip and data registration, and there is little difference in data bit width. Therefore, when these arithmetic units are extracted for reuse as a common unit, the inverse quantization and inverse transform processes under different standards can be implemented by controlling the call of the arithmetic unit under different standards. Under the condition of achieving standard processing performance, resource reuse is achieved to a greater extent, thus saving the logic implementation area of a multi-standard decoder.

Embodiment III

Figure 12:
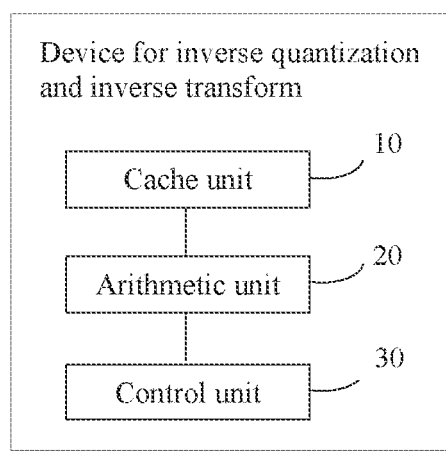
FIG. 12 is a schematic structural diagram of a device for inverse quantization and inverse transform according to an embodiment of the present disclosure.

FIG. 12 is a schematic structural diagram of a device for inverse quantization and inverse transform according to some embodiments of the present disclosure. As shown in FIG. 12, the device includes:

a cache unit 10, configured to store data;

an arithmetic unit 20, configured to perform an arithmetic operation; and a control unit 30, configured to perform inverse quantization processing on input data according to inverse quantization characteristics of different coding and decoding standards; determine whether secondary inverse transform processing is necessary according to a coding and decoding standard of the input data; perform, when determining that secondary inverse transform processing is necessary, secondary inverse transform processing on data obtained through the inverse quantization processing, first one-dimensional inverse transform control processing on data obtained through the second inverse transform processing, and second one-dimensional inverse transform control processing on data obtained through the first one-dimensional inverse transform control processing; and perform, when determining that secondary inverse transform is unnecessary, first one-dimensional inverse transform control processing on the data obtained through the inverse quantization processing and second one-dimensional inverse transform control processing on the data obtained through the first one-dimensional inverse transform control processing.

The control unit 30 is further configured to:

determine whether it is necessary to perform the post-processing on the data obtained through the second one-dimensional inverse transform control processing;

perform, when determining that post-processing is necessary, post-processing on the data obtained through the second one-dimensional inverse transform control processing, and output data obtained through the post-processing; and output, when determining that post-processing is unnecessary, the data obtained through the second one-dimensional inverse transform control processing.

The control unit 30 may be configured to:

perform size transformation on the data obtained through the second one-dimensional inverse transform control processing, such that data obtained through the size transformation are matched with a size standard of a transformation unit.

The control unit 30 may be configured to:

determine, when the coding and decoding standard of the input data is a preset standard and an algorithm adopted in the preset standard includes a preset algorithm, that it is necessary to perform post-processing on the data obtained through the second one-dimensional inverse transform control processing.

The control unit 30 may be configured to:

for the different coding and decoding standards, perform, by calling an arithmetic unit, operations for implementing first one-dimensional inverse transform control processing required by processing at different processing time points, the operations for implementing first one-dimensional inverse transform control processing including multiplication, addition, clip and data registration.

The control unit 30 may be configured to:

for the different coding and decoding standards, perform, by calling the arithmetic unit, operations for implementing second one-dimensional inverse transform control processing required by processing at different processing time points, the operations for implementing second one-dimensional inverse transform control processing including multiplication, addition, clip and data registration.

In practical applications, the cache unit 10 may be implemented by a register, the arithmetic unit 20 may be implemented by a multiplier, an adder or other devices with corresponding arithmetic functions, and the control unit 30 may be implemented by a Central Processing Unit (CPU), a Microprocessor Unit (MPU), a Digital Signal Processor (DSP) or a Field-Programmable Gate Array (FPGA) located in the device for inverse quantization and inverse transform.

The aforementioned device for inverse quantization and inverse transform may be applied into chips.

The device for inverse quantization and inverse transform according to this embodiment may allow the functional parts for inverse quantization and inverse transform to be compatible with the previous standards and support different standards with a smaller chip area and lower cost.

The embodiment also provides a non-transitory computer-readable storage medium storing a computer program, and while the computer program is executed by a processor, any one or more of the methods for inverse quantization and inverse transform mentioned above can be implemented.

The computer storage medium may be any one of various types of storage media, and in this embodiment, the computer storage medium may be a non-transient storage medium.

Those of ordinary skill in the art should understand that the function of each program in the storage medium according to this embodiment may be understood with reference to the related description of the method for inverse quantization and inverse transform of the embodiment.

Compared with the existing technology, the method for inverse quantization and inverse transform according to some embodiments of the present disclosure can allow the functional sub-modules for inverse quantization and inverse transform to be compatible with the previous standards and support different standards with a smaller chip area and lower cost. According to some embodiments of the present disclosure, for the functional parts for inverse quantization and inverse transform, the arithmetic unit with smaller granularity, such as a multiplier, an adder, a register and the like, is used to reuse a corresponding logic to the maximum extent, and inverse quantization is also included in the range of resource reuse, thus saving more resources.

Embodiments of the present disclosure can be combined without conflict in any way.

In the embodiments provided in the present disclosure, it should be understood that the method and device disclosed may be implemented in other ways. The embodiments of the device described above are merely illustrative. For example, the division of the units is merely the division of logical functions, and in actual implementation, there may be other ways for division. For example, multiple units or components may be combined, or may be integrated into another system, or some features may be ignored or not implemented. In addition, the coupling, direct coupling or communication connection between the components shown or discussed may be indirect coupling or communication connection through some interfaces, equipment or units, and may be electrical, mechanical or in other forms.

The units described above as separated components may or may not be physically separated, and the components displayed as units may or may not be physical units, that is, they may be located in one place or distributed to multiple network units. Some or all of the units may be selected according to actual needs to implement this embodiment.

In addition, the functional units in the embodiments of the present disclosure may all be integrated into a second processing unit, or each of the functional units may be implemented as a separate unit, or two or more units may be integrated into one unit. The aforementioned integrated units may be implemented in the form of hardware or in the form of hardware plus software functional units.

What is claimed is:

1. A method for inverse quantization and inverse transform, comprising:

performing inverse quantization processing on input data according to inverse quantization characteristics of different coding and decoding standards;

determining whether secondary inverse transform processing is necessary according to a coding and decoding standard of the input data;

performing, in response to determining that the secondary inverse transform processing is necessary, the secondary inverse transform processing on data obtained through the inverse quantization processing, first one-dimensional inverse transform control processing on data obtained through the secondary inverse transform processing, and second one-dimensional inverse transform control processing on data obtained through the first one-dimensional inverse transform control processing;

performing, in response to determining that the secondary inverse transform processing is unnecessary, first one-dimensional inverse transform control processing on the data obtained through the inverse quantization processing, and second one-dimensional inverse transform control processing on the data obtained through the first one-dimensional inverse transform control processing;

determining whether it is necessary to perform post-processing on the data obtained through the second one-dimensional inverse transform control processing;

performing, in response to determining that the post-processing is necessary, size transformation on the data obtained through the second one-dimensional inverse transform control processing, such that data obtained through the size transformation are matched with a size standard of a transformation unit, and outputting data obtained through the size transformation, and outputting, in response to determining that the post-processing is unnecessary, the data obtained through the second one-dimensional inverse transform control processing.

2. The method of claim 1, wherein determining whether it is necessary to perform post-processing on the data obtained through the second one-dimensional inverse transform control processing comprises:
  determining, in response to that the coding and decoding standard of the input data is a preset standard and an algorithm adopted in the preset standard comprises a preset algorithm, that it is necessary to perform the post-processing on the data obtained through the second one-dimensional inverse transform control processing.

3. The method of claim 1, wherein performing first one-dimensional inverse transform control processing on the data obtained through the inverse quantization processing comprises:
  for the different coding and decoding standards, performing, by calling an arithmetic unit, operations for implementing first one-dimensional inverse transform control processing required by processing at different processing time points, wherein the operations for implementing one-dimensional inverse transform control processing comprise multiplication, addition, clip and data registration.

4. The method of claim 1, wherein performing second one-dimensional inverse transform control processing on the data obtained through the first one-dimensional inverse transform control processing comprises:
  for the different coding and decoding standards, performing, by calling the arithmetic unit, operations for implementing second one-dimensional inverse transform control processing required by processing at different processing time points, wherein the operations for implementing second one-dimensional inverse transform control processing comprise multiplication, addition, clip and data registration.

5. A device for inverse quantization and inverse transform, comprising:
  a cache unit, configured to store data;
  an arithmetic unit, configured to perform an arithmetic operation; and
  a control unit, configured to perform inverse quantization processing on input data according to inverse quantization characteristics of different coding and decoding standards; determining whether second inverse transform processing is necessary according to a coding and decoding standard of the input data; perform, in response to determining that the second inverse transform processing is necessary, the second inverse transform processing on data obtained through the inverse quantization processing, first one-dimensional inverse transform control processing on data obtained through the secondary inverse transform processing, and second one-dimensional inverse transform control processing on data obtained through the first one-dimensional inverse transform control processing; and perform, in response to determining that secondary inverse transform is unnecessary, the first one-dimensional inverse transform control processing on the data obtained through the inverse quantization processing and the second one-dimensional inverse transform control processing on the data obtained through the first one-dimensional inverse transform control processing,
  wherein the control unit is further configured to determine whether it is necessary to perform post-processing on the data obtained through the second one-dimensional inverse transform control processing; perform, in response to determining that the post-processing is necessary, size transformation on the data obtained through the second one-dimensional inverse transform control processing, such that data after the size transformation is matched with a size standard of a transformation unit, and output data obtained through the size transformation; and output, in response to determining that the post-processing is unnecessary, the data obtained through the second one-dimensional inverse transform control processing.

6. The device for inverse quantization and inverse transform of claim 5, wherein the control unit is configured to:
  determine, in response to that the coding and decoding standard of the input data is a preset standard and an algorithm used in the preset standard comprises a preset algorithm, that it is necessary to perform post-processing on the data obtained through the second one-dimensional inverse transform control processing.

7. The device for inverse quantization and inverse transform of claim 5, wherein the control unit is configured to:
  for the different coding and decoding standards, perform, by calling the arithmetic unit, operations for implementing first one-dimensional inverse transform control processing required by processing at different processing time points, wherein the operations for implementing first one-dimensional inverse transform control processing comprise multiplication, addition, clip and data registration.

8. The device for inverse quantization and inverse transform of claim 5, wherein the control unit is configured to:
  for the different coding and decoding standards, perform, perform, by calling the arithmetic unit, operations for implementing second one-dimensional inverse transform control processing required by processing at different processing time points, wherein the operations for implementing second one-dimensional inverse transform control processing comprise multiplication, addition, clip and data registration.

9. A non-transitory computer-readable storage medium storing computer-executable instructions, which when executed, perform a method for inverse quantization and inverse transform, the method comprising:
  performing inverse quantization processing on input data according to inverse quantization characteristics of different coding and decoding standards;
  determining whether secondary inverse transform processing is necessary according to a coding and decoding standard of the input data;
  performing, in response to determining that the secondary inverse transform
  processing is necessary, the secondary inverse transform processing on data obtained through the inverse quantization processing, first one-dimensional inverse transform control processing on data obtained through the secondary inverse transform processing, and second one-dimensional inverse transform control processing on data obtained through the first one-dimensional inverse transform control processing;
  performing, in response to determining that the secondary inverse transform processing is unnecessary, first one-dimensional inverse transform control processing on the data obtained through the inverse quantization processing, and second one-dimensional inverse transform control processing on the data obtained through the first one-dimensional inverse transform control processing;
  determining whether it is necessary to perform post-processing on the data obtained through the second one-dimensional inverse transform control processing;

performing, in response to determining that the post-processing is necessary, size transformation on the data obtained through the second one-dimensional inverse transform control processing, such that data obtained through the size transformation are matched with a size standard of a transformation unit, and outputting data obtained through the size transformation, and outputting, in response to determining that the post-processing is unnecessary, the data obtained through the second one-dimensional inverse transform control processing.

\* \* \* \* \*